United States Patent [19]

Chiba et al.

[11] 3,993,364
[45] Nov. 23, 1976

[54] ANTI-SKID DEVICE FOR USE WITH VEHICLE BRAKE SYSTEMS

[75] Inventors: Haruo Chiba, Ageo; Akiteru Fujiki, Omiya, both of Japan

[73] Assignee: Sanwa Seiki Mfg. Co. Ltd., Yono, Japan

[22] Filed: Feb. 18, 1975

[21] Appl. No.: 550,672

[52] U.S. Cl. .......................... 303/21 F; 188/181 A; 303/61; 303/84 R
[51] Int. Cl.² .................................................. B60T 8/06
[58] Field of Search ................. 188/181 A, 181 R; 303/21 F, 21 FB, 21 FS, 21 FM, 61, 84 R, 114, 115

[56] References Cited
UNITED STATES PATENTS

| | | | |
|---|---|---|---|
| 3,466,098 | 9/1969 | Pieren et al. | 303/61 X |
| 3,503,655 | 3/1970 | Heimler | 303/21 FB |
| 3,731,979 | 5/1973 | Mikaila | 303/61 X |
| 3,744,853 | 7/1973 | Cullen | 303/21 FB |
| 3,754,795 | 8/1973 | Von Lowis et al. | 188/181 A X |
| 3,761,140 | 9/1973 | Lewis et al. | 303/21 FB |

Primary Examiner—Duane A. Reger
Attorney, Agent, or Firm—Pollock, Vande Sande and Priddy

[57] ABSTRACT

A vehicle brake system having a power booster coupled to a master cylinder for normally supplying fluid pressure to the wheel cylinders of the vehicle includes an anti-skid device comprising an actuator hydraulically connected in parallel with the power booster for applying brake pressure to the wheel cylinders independently of the power booster when skidding occurs. The brake system includes solenoid controlled valves responsive to electrical signals generated when skidding occurs and operative to interrupt hydraulic communication between the power booster and wheel cylinders while establishing hydraulic communication between the actuator and the wheel cylinders.

2 Claims, 1 Drawing Figure

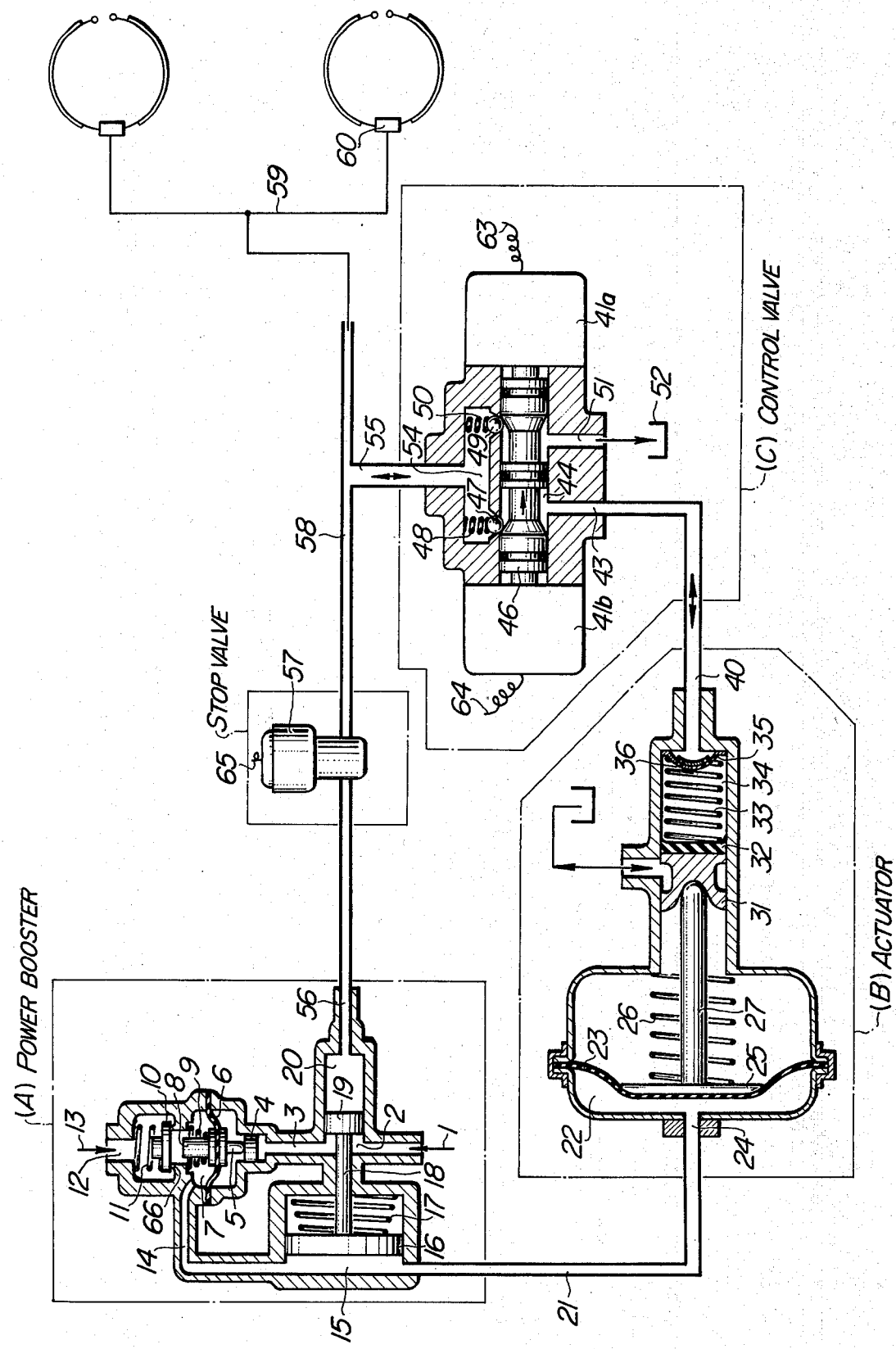

ANTI-SKID DEVICE FOR USE WITH VEHICLE BRAKE SYSTEMS

BACKGROUND AND SUMMARY OF THE INVENTION

The present invention relates to an anti-skid device for use with a vehicle brake system.

In a vehicle brake system of the type in which a power booster is operatively coupled to a master cylinder, the brake liquid to be fed into the wheel cylinders is increased in pressure by the power booster through the master cylinder when the brake pedal is depressed. The present invention has for its object to provide an anti-skid device for use with the vehicle brake system of the type described.

Briefly stated, an anti-skid device in accordance with the present invention comprises an actuator hydraulically communicated with a power booster for feeding a control valve with the liquid under a predetermined pressure regardless of the braking action, the control valve operating, in response to the electrical signals which are generated by detecting means when skidding occurs, alternately to feed the brake liquid to the wheel cylinders from the actuator and to discharge the brake liquid under pressure in the wheel cylinders into an oil reservoir; and a solenoid controlled stop valve for interrupting a brake liquid line between said power booster and the wheel cylinders in response to the electrical signal from said detecting means.

The above and other objects, features and advantages of the present invention will become more apparent from the following description of one preferred embodiment thereof taken in conjunction with the accompanying drawing.

BRIEF DESCRIPTION OF THE DRAWING

The single FIGURE is a diagrammatic view of an anti-skid device in accordance with the present invention.

DESCRIPTION OF THE PREFERRED EMBODIMENT

Referring to the single FIGURE illustrating one preferred embodiment of the present invention, when the brake pedal (not shown) is depressed, the fluid under pressure from a master cylinder (not shown) flows into a chamber 2 in a power booster (A) as indicated by the arrow 1. The fluid under pressure flows into a passage 3, pushing up against springs 9 and 11 a piston 4, a push rod 5, a diaphragm 6, and a plunger 8 so that a valve 10 is moved away from a valve seat 66. The fluid under pressure indicated by the arrow 13 flows through a port 12 and the space between the valve 10 and its valve seat 66 into a chamber 7 and then into a chamber 15 through a passage 14. In the chamber 15, the fluid under pressure forces a piston 16 toward the right in the FIGURE against a spring 17 so that a piston 19, coupled by a push rod 18 to the piston 16, is displaced toward the right. Thus the fluid within a chamber 20 is compressed and is forced to flow through a passage 56 into a hydraulic line 58.

The fluid under pressure also flows through a passage 21 and a port 24 into an actuator chamber 22 of an actuator (B) so that a diaphragm 23 is displaced toward the right against a spring 26. The diaphragm 23 is connected through a push plate 25, a push rod 27, and a piston 31 to a rubber cup 32. Therefore, the rubber cup 32 is displaced against a spring 33 so that the liquid in a chamber 34 is compressed and is forced to flow through holes 36 formed through a spring seat 35 and a passage 40 toward an inlet port 43 of a solenoid controlled valve (C).

When a spool 46 of the solenoid controlled valve (C) is slightly displaced in the direction indicated by the arrow thereon, its tapered portion raises a ball 47 so that the fluid under pressure within a chamber 44 may flow through a passage 55 and a hydraulic line 59 into a wheel cylinder 60. Thus the brake is applied. The spool 46 is displaced when the electrical signal is applied through a wire 64 to an electromagnet 41b. The electrical signal is also applied to a wire 65 of a solenoid controlled stop valve 57 so that the flow of the liquid under pressure from the port 56 of power booster (A) to the hydraulic line 58 is interrupted. As soon as the electrical signal to the solenoid 41b has been interrupted, the electrical signal is applied through wire 63 to the solenoid 41a, which is energized so that the spool 46 is displaced toward the left. The ball 47 is therefore pushed downwardly under the force of a spring 48 while a ball 49 is lifted against the force of a spring 50 so that the fluid under pressure returns from the wheel cylinder 60 through the hydraulic line 59, the passage 55, the chamber 54, and an outlet passage 51 into an oil reservoir 52. Thus the brake is released.

When the electrical signal is applied through the wire 64 to the solenoid 41b again, the spool 46 is displaced to the right (indicated by the arrow) so that the fluid under pressure flows again from the chamber 34 through the passages 40 and 43, the chamber 54, the passage 55 and the hydraulic line 59 into the wheel cylinder 60. Thus, the brake is applied again. So long as the liquid under pressure flows into the chamber 2 as indicated by the arrow 1, the liquid under pressure indicated by the arrow 13 flows through the chamber 15, and the passages 21 and 24 into the actuator chamber 22 so that the pressure is exerted to the liquid remaining in the chamber 34. Thus, even when the electrical signals are alternately applied through the wires 63 and 64 to alternately energize the solenoids 41a and 41b to alternately apply and release the brake, a constant pressure may be exerted to the liquid within the chamber 34.

During the time the electrical signal is alternately applied to the wires 63 and 64, the electrical signal is kept applied through the wire 65 to the stop valve 57 so that the liquid under pressure is prevented from flowing from the port 56 to the hydraulic line 58.

When the electrical signal is not applied to the wire 63, 64 or 65 due to the failure of the electric circuit (not shown), the balls 47 and 49 close the ports under the force of the springs 48 and 50 so that the flow of the liquid under pressure from the chamber 34 to the wheel cylinder 60 is interrupted. When no electrical signal is applied through the wire 65 to the stop valve 57, the latter is opened so that the liquid under pressure flows from the port 56 through the hydraulic lines 58 and 59 into the wheel cylinder 60. Thus the brake may be applied in its usual manner.

As described hereinbefore, according to the present invention, when wheel slipping is detected, the control valve is automatically actuated in response to the electrical signals so that the liquid under a constant pressure may be fed to the wheel cylinders 60 or the liquid under pressure in the wheel cylinders may be returned to the oil reservoir 52. Thus skidding may be prevented and the maximum effective braking may be provided. When there is no electrical signal representative of the tire slip or skidding, the flow of the liquid under pressure from the actuator is interrupted by the control valve (C), and the solenoid controlled stop valve 65 is de-energized so that the braking liquid is directly fed from the power booster (A) to the wheel cylinders 60. Thus the brake may be applied in a usual manner. The anti-skid device in accordance with the present invention is very simple in construction yet very reliable in operation.

What is claimed is:

1. In a vehicle brake system of the type having a master cylinder and a power booster operatively coupled to said master cylinder, said power booster having an actuating pressure inlet port through which actuating pressure is introduced into the power booster for actuation thereof in response to pressurized fluid from said master cylinder and having a brake pressure outlet port through which brake pressure is fed to the wheel cylinders of the vehicle in response to actuation of said power booster by the actuating pressure, an anti-skid device comprising:
an actuator hydraulically connected in parallel with said power booster in the brake system for applying brake pressure to said wheel cylinders independently of said power booster when skidding occurs, said actuator being hydraulically communicated to said actuating pressure inlet port of the power booster, a control valve interposed between said actuator and said wheel cylinders, said control valve being connected to receive said brake pressure from said actuator and being operable to interrupt communication between said actuator and said wheel cylinders when no skidding occurs and operable alternately to feed said brake pressure to the wheel cylinders to discharge brake pressure from the wheel cylinders into a reservoir when skidding occurs, and a stop valve interposed between said brake pressure outlet port of said power booster and said wheel cylinders, said stop valve being operable to interrupt communication between said brake pressure outlet port and the wheel cylinders when skidding occurs.

2. The brake system of claim 1 wherein said control valve and said stop valve comprise electrically responsive solenoid valves, and means responsive to occurrence of skidding for supplying electrical control signals to said valves to control their operating states.

* * * * *